United States Patent [19]

Oliver et al.

[11] Patent Number: 4,734,336

[45] Date of Patent: Mar. 29, 1988

[54] TWIN PLY PAPERS FOR INK JET PROCESSES

[75] Inventors: John F. Oliver; Arthur Y. Jones, both of Mississauga, Canada

[73] Assignee: Xerox Corporation, Stamford, Conn.

[21] Appl. No.: 914,212

[22] Filed: Oct. 2, 1986

[51] Int. Cl.[4] ........................ B32B 21/04; B32B 21/14; B32B 21/06; D21F 11/00

[52] U.S. Cl. ................................ 428/537.5; 428/453; 428/537.7; 428/535; 428/511; 346/135.1; 162/123; 162/128

[58] Field of Search ...................... 428/452, 453, 537.5, 428/537.7, 511, 535; 346/135.1; 162/123, 127, 128

[56] References Cited

U.S. PATENT DOCUMENTS

| | | | |
|---|---|---|---|
| 1,676,727 | 7/1928 | Carter . | |
| 2,213,643 | 9/1940 | Alton | 91/68 |
| 3,372,084 | 3/1968 | Arledter | 162/128 |
| 3,900,690 | 8/1975 | Schwarz | 428/447 |
| 3,914,518 | 10/1975 | Haskell | 428/451 |
| 4,425,405 | 1/1984 | Murakami et al. | 428/537.5 X |
| 4,460,637 | 7/1984 | Miyamoto et al. | 346/135.1 X |
| 4,474,847 | 10/1984 | Schröder et al. | 428/537.5 X |
| 4,540,628 | 9/1985 | Oberdeck et al. | 346/135.1 X |
| 4,554,181 | 11/1985 | Cousin et al. | 428/537.5 X |
| 4,576,867 | 3/1986 | Miyamoto | 428/537.5 X |
| 4,592,954 | 6/1986 | Malhotra | 346/135.1 X |
| 4,613,525 | 9/1986 | Miyamoto et al. | 428/537.5 X |
| 4,617,239 | 10/1986 | Maruyama et al. | 428/537.5 X |

FOREIGN PATENT DOCUMENTS

| | | | |
|---|---|---|---|
| 184680 | 12/1980 | Japan | 428/452 |
| 56-49100 | 5/1981 | Japan . | |
| 170699 | 10/1981 | Japan | 428/452 |
| 061915 | 3/1984 | Japan | 428/537.5 |
| 115235 | 6/1984 | Japan | 428/452 |
| 84/04115 | 4/1984 | PCT Int'l Appl. . | |

*Primary Examiner*—George F. Lesmes
*Assistant Examiner*—D. R. Zirker
*Attorney, Agent, or Firm*—E. O. Palazzo

[57] ABSTRACT

A twin ply uncoated paper for ink jet processes comprised of a supporting paper substrate sheet as a first ply, and thereover as a second ply a paper sheet with filler additives attached to the fibers thereof, which additives are, for example, selected from the group consisting of amorphous synthetic silicas, inorganic silicates, metal alumino-silicates, and inorganic oxides. Three ply papers are also illustrated wherein there is situated between two second plies a supporting substrate sheet.

12 Claims, No Drawings

TWIN PLY PAPERS FOR INK JET PROCESSES

BACKGROUND OF THE INVENTION

The invention is generally directed to uncoated papers, and more specifically, the present invention is directed to economical twin ply papers useful in ink jet processes. Thus, in one embodiment the present invention relates to uncoated twin ply papers containing, for example, various liquid absorbing fillers, inclusive of specific silicas, which papers enable the rapid absorption drying of ink jet compositions, and wherein the images obtained are comparable to silica coated grade ink jet papers, and are of superior image quality as compared to the ordinary uncoated papers, as illustrated in M. Lyne and J. S. Aspler, "Paper for Ink Jet Printing", TAPPI Journal 68 (5) 1985, pp. 106–110. Also, the twin ply papers of the present invention exhibit improved drying in that, for example, no heating is needed as is the situation with some coated and uncoated papers presently selected for ink jet processes. In addition, the uncoated twin-ply papers of the present invention have substantially no undesirable show-through and strike-through characteristics, and images generated thereon are of improved sharpness, that is for example there is negligible image raggedness as compared to many known uncoated and coated ink jet papers. Furthermore, the uncoated papers of the present invention are similar to ordinary paper in feel, appearance and receptiveness to lead pencil marking, while simultaneously possessing printing performances comparable to premium grade ink jet coated papers. Additionally, the twin ply papers of the present invention are also useful in other liquid development systems, such as electrostatic xerography and direct electrography.

Pigment coated papers developed for ink jet processes are well known. These papers are usually comprised of a supporting substrate and thereover high surface area hydrophilic pigment, such as colloidal silicas dispersed in an appropriate organic binder system. Disadvantages associated with these papers, especially the coating thereof, include their high process costs, relatively poor substrate adhesion, and the need for special coating processes to circumvent the peculiar rheology associated with the high surface area pigments selected. Additionally, the prior art coated papers do not have the feel, appearance and pencil marking receptivity of ordinary paper, and therefore are undesirable to some users.

As indicated herein, the uncoated papers of the present invention are especially useful in ink jet processes. Marking compositions which are useful in the aforementioned ink jet printing processes are well known, and generally contain water soluble dyes. There is thus described, for example, in U.S. Pat. No. 3,846,141, the disclosure of which is totally incorporated herein by reference, an ink composition useful in jet printing comprised of an aqueous solution of a water-soluble dye and a humectant material formed of a mixture of a lower alkoxy triglycol; and at least one other compound selected from the group consisting of a polyethylene glycol, a lower alkyl ether of diethylene glycol, and glycerol. According to the disclosure of this patent, the printing inks have the desired viscosity for use in jet printing in that the viscosity of the composition is subjected to little variation with use as water is lost by evaporation during recirculation of the ink composition through the jet printer. Further, apparently the humectant system disclosed in this patent substantially prevents or minimizes drying of the printing ink in the orifice or nozzle during down time of the printer, such as when the printer is rendered inoperative. As further disclosed in this patent, the basic imaging technique in ink jet printing involves the use of one or more ink jet assemblies connected to a pressurized source of ink. Each individual ink jet includes a very small orifice usually of a diameter of 50 microns, which is energized by magneto restrictive piezo-electric means for the purpose of emitting a continuous stream of uniform droplets of ink at a rate of 33 to 75 kilohertz. This stream of droplets is then directed onto the surface of a moving web of, for example paper, and is controlled to form printed characters in response to video signals derived from an electronics character generator, and as a result of an electrostatic deflection system. In addition, there are disclosed in U.S. Pat. No. 4,279,653 ink jet compositions containing water-soluble wetting agents, a water-soluble dye and an oxygen absorber. Similarly, U.S. Pat. No. 4,196,007 describes an ink jet printing composition containing an aqueous solution of a water-soluble dye and a humectant consisting of at least one water-soluble unsaturated compound. Other prior art disclosing aqueous inks for ink jet printing include U.S. Pat. Nos. 4,101,329; 4,290,072; 4,383,859; 4,235,773; 4,279,814; 4,443,371; 4,286,989 and 4,299,630. Additionally, there is disclosed in U.S. Pat. No. 4,197,135 ink compositions with improved waterfastness comprised of at least one water soluble dye, and a polyamine with 7 or more nitrogen atoms per molecule. The disclosures of each of the aforementioned patents are totally incorporated herein by reference.

Therefore, there is a need for uncoated papers that are useful in ink jet processes. In addition, there is a need for economical uncoated ink jet papers providing image performance comparable to silica coated papers; and further the papers of the present invention have the feel and appearance of ordinary uncoated paper. Additionally, there is a need for uncoated papers that will enable the rapid drying of inks on the surface thereof, which papers also permit developed images of high resolution, and superior density when compared, for example, to many prior art papers.

SUMMARY OF THE INVENTION

It is thus an object of the present invention to provide uncoated papers that overcome some of the above noted disadvantages.

In another object of the present invention there are provided uncoated twin ply papers that possess rapid drying times.

Furthermore, in another object of the present invention there are provided uncoated twin ply papers that will enable images of high resolution, and superior color vibrancy and image density as compared to uncoated papers.

Furthermore, in another object of the present invention there are provided uncoated twin ply papers with varying pulp/fiber and surface ly thickness dependent upon image quality, ink loading, drying and plain paper aesthetic requirements, thereby permitting more economic utilization of filler compared with uncoated bulk filled papers.

In is still another object of the present invention there are provided uncoated twin ply papers containing in the second ply certain inorganic or organic additives to enhance dye affinity and hence image waterfastness.

In yet another object of the present invention there are provided three ply papers with a supporting ply paper situated between the first ply and the second ply.

These and other objects of the present invention are accomplished by providing uncoated twin ply papers for ink jet processes. More specifically, in accordance with the present invention there are provided uncoated twin ply papers comprised of a supporting substrate sheet, and thereover a second sheet formulated from, for example, a blend of a pulp suspension and filler components. Therefore, in one specific embodiment of the present invention there are provided uncoated papers comprised of a supporting substrate of paper obtained from, for example, bleached hardwoods and softwood fibers; and a second ply of paper with, for example, fillers of colloidal silicas attached to the fibers thereof, and wherein the aforementioned second ply can be formulated from a blend of paper pulp and filler. More specifically, the second ply is formulated by first blending a filler such as a colloidal silica with an agitated pulp suspension, for example, of bleached hardwoods and/or softwoods, cotton, eucalyptus, or synthetic fiber blends enabling a paper with discrete plies formulated on a laboratory centrifugal-former type paper machine, inclusive of a Formette Dynamique, by means of applying the second paper ply to a previously formed base paper ply to enable a two ply paper of a total basis weight of, for example, approximately 75 $g/m^2$, and wherein the two plies are initially maintained as a wet fiber slurry, and thereafter are de-watered. Depending upon the end-use application, the second ply composition may be comprised of from 25/75 to 75/25 filler/pulp ratios, and the thickness thereof can be of from about 5 to about 50 microns. Also, depending upon the filler concentration various types of natural and synthetic binder resins are utilized to permit adequate end-use sheet integrity and acceptable image waterfastness.

In one important embodiment of the present invention there are provided uncoated papers comprised of a base, or supporting sheet of paper obtained from bleached hardwoods, and softwood fibers; and thereover a second paper ply with a thickness of from about 5 microns to about 50 microns obtained from bleached hardwood and softwood fibers; and wherein there are attached the paper ply fibers of the second ply fillers selected from the group consisting of synthetic amorphous silicas, such as Syloid 74 available from the Grace-Davison Company; calcium silicates, inclusive of XP974 available from Huber Corporation; zinc oxides, such as Canfelzo 3, available from Pigment & Chemical Co., Ltd.; surface chemically modified sodium aluminum silicates, including CH-430-106-1 available from Huber Corporation; calcium fluoride/silicas, available from Opalex, C, Kemira Oy, Finland; and the like.

Another embodiment of the present invention relates to a twin ply uncoated paper for ink jet processes comprised of a supporting paper substrate sheet as a first ply in a thickness of 50 to 90 microns, and thereover as a second ply a paper sheet with a thickness of from about 5 to about 50 microns and filler additives, for example from about 25 to about 75 percent by weight, attached to the fibers thereof, which additives are selected from the group consisting of synthetic silicas, inorganic silicas, such as sodium alumino-silicates, and inorganic oxides yielding a composite sheet with excellent drying, high image resolution, that is for example images with high edge definition, and wherein the aforementioned sheet also possesses excellent waterfastness with certain colored aqueous anionic dye-based ink jet compositions.

In addition, in another embodiment of the present invention there is provided a three ply uncoated paper for ink jet processes comprised of a supporting paper substrate sheet as a first ply situated between a second ply paper sheet with a thickness of from about 5 to about 50 microns and filler additives, for example, from about 25 to about 75 percent by weight attached to the fibers thereof, which additives are selected from the group consisting of synthetic silicas, inorganic silicates, such as sodium alumino-silicates, inorganic oxides, and the like; and a third ply paper sheet with a thickness of from about 5 to about 50 microns and filler additives, for example, from about 25 to about 75 percent by weight attached to the fibers thereof, which additives are selected from the group consisting of synthetic silicas, inorganic silicates, such as sodium aluminosilicates, inorganic oxides, and the like.

Examples of the first plies, or supporting substrates with a thickness of from about 50 microns to about 100 microns include paper obtained from (1) bleached hardwoods and softwood fibers; (2) cotton fibers; and the like, which papers are commercially available as, for example, softwood (Domtar Q90), hardwood (Domtar Seagul 'W') and cotton linters (Buckeye 513). The second and third plies can be comprised of the same paper as the first ply containing as an integral part of the fibers thereof the additives indicated herein, inclusive of amorphous silicas, inorganic silicates, metal aluminosilicates and inorganic oxides. The second and third plies, which are of a thickness of from 5 to 50 microns, can be prepared by mixing from about 25 to about 75 percent by weight of additives with from about 75 to about 25 percent by weight of paper pulps. The aforementioned base sheet mixture is maintained as a wet fiber slurry prior to de-watering on the forming wire of the paper machine. Thereafter, the second ply can be applied to the first partially de-watered ply, and then vacuum de-watered to enable formation of a paper structure with discrete plies. The third ply is formulated in a similar manner.

Other components may be added to the second or third ply to further improve certain characteristics of the resulting papers. Thus, for example, there can be added in the pulp stock or via size press treatment, dry strength synthetic or natural product binders, such as an anionic polyacrylamide, starch, and the like in an amount of from about 0.5 to about 7 percent primarily for the purposes of achieving ply-ply, and fiber-filler adhesion without adversely effecting the ink absorbing properties of the final papers. Cationic polymers or surfactant type treatments may similarly be incorporated to enhance dye waterfastness.

Alternatively, as indicated herein the papers of the present invention can comprise a supporting substrate sheet situated between two individual plies to form a three ply structure with printing performance on both sides comparable to the aforementioned two ply papers.

Compared to commercially available ink jet coated papers comprised of colloidal silicas, the uncoated twin ply papers of the present invention when used with a selected glycol/water based ink jet composition in either text or full color graphics printing processes have comparable image circularity, acceptable spreading characteristics, excellent drying times, negligible image show-/strike-through, improved waterfastness, and acceptable color rendition, that is for example, negligible diminution of potential dye color, and comparable image optical densities for black and primary colors.

The following Examples are provided, which illustrate, but are not intended to limit the scope of the present invention. Parts and percentages are by weight unless otherwise indicated.

EXAMPLE I

There were prepared three twin ply papers on a laboratory centrifugal paper machine former "Formette Dynamique", (see "Simulation of Fourdrinier Paper Machine Forming in the Laboratory," Pulp & Paper Canada 84(12) 1983, pp. T283–286, the disclosure of which is totally incorporated herein by reference). The base sheets were comprised of a fine paper furnish containing a 75/25 percent bleached hardwood (Domtar Seagul 'W') and softwood fibers (Domtar Q90) beaten to a Canadian Standard Freeness value of approximately 400 to 450; and the second ply in each instance was comprised of the same furnish blended with the high surface area colloidal silica pigment filler, Syloid 74, available from Grace-Davison. More specifically, a first pulp suspension for the base ply was supplied from stock tank A at 0.4 percent consistency to produce a base sheet of 65 grams/meter$^2$ basis weight onto a forming wire via a vertically-oscillating nozzle. The second agitated pulp suspension (stock tank B) containing a blend of pulp and 50 percent silica filler was applied to the first pre-formed ply (which was maintained as a wet fiber slurry on the wire) by an oscillating nozzle, and then drained to form a paper structure with two discrete plies having total basis weight of about 75 grams/meter$^2$. The thickness of the base or second ply may accordingly be varied by increasing the number of nozzle passes. In this example the number of nozzle passes was computed so as to result in twin ply sheets with a top ply 8, 14 and 20 percent of the total sheet thickness designated Samples 1, 2 and 3, respectively. After draining the sheets to about 20 percent dryness, that is a level at which it possessed adequate wet strength, they were stripped from the wire, further de-watered on a single nip wet press with the second (top) ply sandwiched against a smooth Teflon surface and the base ply against a press felt, and then dried on a photographic-type drum dryer. The thickness of the first and second plies together was about 100 microns.

The performance of the resultant papers was evaluated on a Xerox Corporation Diablo Model C150 color ink jet printer using a print test pattern composed of: solid areas (inch square), text, and various pixel width lines in primary as well as mixed colors. The optical density of the printed papers was measured with a Tobias RX densitometer, and selected test pattern features were analyzed in an optical microscope. Ink absorption drying characteristics were evaluated with a Bristow type liquid absorption apparatus (Svensk Papperstidning 70,623(1967)).

The optical density of ink jet prints on paper Samples 1, 2 and 3 are provided in Table 1 along with the uncoated (Sample A) and commercial coated (Sample B) ink jet papers supplied with the aforementioned printer. Compared with Sample A the image optical density of the above prepared twin ply papers 1, 2 and 3 was increased in all situations. Optical density (back side), which is indicative of the extent of image show-through, also significantly improves as the thickness of the top ply increases.

Image resolution data is summarized in Table 2. This data indicates that as the ply thickness decreases the single pixel line width decreases to a value below Sample A and slightly higher than the value for Sample B, that is the coated paper control which has a nonfibrous surface. Similar trends are evident for the yellow and magenta primary colors which are superimposed on the papers of Table 2 to produce red images. Compared with Sample B, the line width data shows that the thicker top ply thickness, Sample 3, has comparable absorption drying capacity. This trend was further established by print rub tests (finger rubbing of the solid print area of the test pattern) which revealed no image smear on multicolored solid areas 2 seconds after printing. Finally, the image circularity (as measured by the technique described in U.S. Pat. No. 4,361,843, the disclosure of which is totally incorporated herein by reference) of a single drop of a black ink (viscosity 2.7 centipoises, and surface tension 57 dynes/cm) was less than about 0.7 on Sample 2 compared to less than 0.8 for Sample B. Corresponding drop spreading factors, that is the ratio of image spot size to drop size, were 2.1 and 1.9 on Samples 2 and B, respectively.

EXAMPLE II

Twin ply papers were prepared by repeating the procedure of Example I with the exception that calcium silicate filler (XP974, Huber Corp.) was incorporated in the top ply. Table 3 summarizes the optical density for three uncoated papers, Samples 4, 5 and 6, and the control papers, Samples A and B. These results demonstrate that the calcium silicate filler was about as effective in the top ply layer as the aforementioned silica insofar as accomplishing optical densities comparable to or better than the control papers. Similarly, the data presented in table 4 indicates that the image resolution for the twin ply uncoated papers was achieved, for example, the single pixel line width, was superior to Sample A; and for the double pixel multi-color line employing twice the ink volume/unit area. Also, the image resolution for the twin ply uncoated papers achieved was very comparable to the uncoated Sample B. The Bristow absorption data recited in Table 5 reveals the high ink absorption rate, and capacity for the twin ply uncoated papers was achieved compared with the control papers; and as a result rapid drying performance for the twin ply uncoated papers was achieved.

In addition, application of this paper for use in a liquid electrophotographic type of printing process as described in U.S. Pat. No. 3,084,043, the disclosure of which is totally incorporated herein by reference, proved highly effective. For example, an ink comprising 8 percent by weight of carbon black dispersed in a blend of natural and synthetic oils yielding a viscosity of 300 centipoises and a surface tension of 38 dynes/cm was used in a Cheshire Addressograph Dl 785 machine to print test pattern images on Sample 5 and a xerographic 4024® bond paper. Absorption drying of images, as determined by thumb rub resistance, was nearly instantaneous for Sample 5 compared with 3 minutes for the latter. Furthermore, Sample 5 showed a marked improvement in line pair resolution with line raggedness, see "The Raggedness of Edges", J. Opt. Soc. Am. 71, 285–288 (1981), approaching 10 microns compared with 25 microns for the xerographic bond control paper. The superior print quality characteristics of the twin ply paper are believed to be attributed to efficient interfiber filling by the microscopically fine high surface area filler particles which diminish the tendency for ink wicking along fibers. In contrast, the surface of a more conventional, bulk filled, bond paper possesses much less filler; and consequently produces prints with more fiber wicking, and hence inferior image edge raggedness.

EXAMPLE III

Twin ply papers incorporating 50 percent of a surface chemically modified sodium silicate (CH430-106-1, Huber Corp.) in the top ply with varying percentage thickness of the total sheet were prepared by repeating the procedure of Example I. Table 6 illustrates optical density data of black solid area prints generated in the Diablo C150 printer, measured before and after 10 minute immersion in water, followed by air drying for Sample 7 with a top ply 14 percent of the total sheet thickness, and Sample B, the control coated paper. A significant improvement in waterfastness of the black ink results from the incorporation of this type of filler in the paper.

EXAMPLE IV

A dry strength synthetic and natural product binder was incorporated into the second ply furnish to achieve ply-ply and fiber-filler adhesion without negating ink absorptive properties and print quality. For example, a 10 percent aqueous starch solution (Cato 72, National Starch & Chemical Corp.) precooked 30 minutes at 98° C., was applied hot onto the twin ply sheet of Sample 2, prepared in accordance with the aforementioned Examples, on a KRK (Japan) Laboratory size press operating at a pressure of 245kPa and speed of 40 meters/minute. At a size press pick-up solids of approximately 7 percent, the surface strength of paper (TAPPI Standard T459-OM-83) increased from a wax pick value of 2, without size treatment, to 5 for Sample 2. Alternatively, similar size treatment with a 10 percent solution of starch (Cato 72), 10 parts, and anionic polyacrylamide (Accostrength 85, American Cyanamid Co.), 1 part, at approximately 7 percent solids pick-up increased the wax pick value from 2, without treatment, to 6 for Sample 2.

EXAMPLE V

As an alternative approach to that outlined in Example III, a specific binder chemistry was selected to enhance subsequent image permanence of ionic ink jet dyes, reference U.S. Pat. No. 4,554,181, the disclosure of which is totally incorporated herein by reference. For example, in the aforementioned size press application a twin-ply sheet (Sample 2) of a 10 percent aqueous solution of starch (Cato 72), 1 part, alum 0.2 part, and cationic polyamine (Cypro 514, American Cyanamid Corp.), 0.2 part, at a size pick-up of approximately 4 percent solids was selected. This paper was evaluated for waterfastness (10 minutes water immersion of this sample printed with an ink loading of 8.5 milliliters/meter$^2$ administered by a Bristow absorption apparatus) with an anionic (Acid Yellow 34) dye. As a result of the aforementioned size press treatment waterfastness was increased from 15 percent without treatment to approximately 80 percent for the treated Sample 2.

EXAMPLE VI

Modification to form a three ply structure with the base ply appropriately sandwiched between the two outer plies of similar composition to that of Example I was prepared. Thus, there was formed a three ply sheet of approximately 75 grams/meter$^2$ total basis weight consisting of a base sheet of approximately 18 grams/meter$^2$ formed from a 100 percent bleached groundwood pulp (Acadia Forest Products Ltd.), second outer ply of approximately the same basis weight as the base sheet and comprised of equal parts calcium silicate (XP974, Huber Corp.), and a 75/25 blend of bleached hardwood (Domtar SEAGUL 'W'), and bleached softwood fibers (Domtar Q90). When partially de-watered, this structure was removed from the wire of the Formette Dynamique and laminated against an identical, previously formed, wet structure in a wet press, as indicated herein, to form a three ply structure. Print quality and ink drying performance of this three ply sheet was similar to the twin ply paper of Example II. Table 7 indicates line width resolution data for three samples of three ply papers prepared with different outer ply thicknesses. There was considerable improvement in the net opacity of the base groundwood sheet due to the high filler content, and light scattering of the outer plies compared with that of the base groundwood sheet alone.

Other modifications of the present invention will occur to those skilled in the art subsequent to a review of the present application. These modifications, and equivalents thereof are intended to be included within the scope of the present invention.

TABLE 1

| | OPTICAL DENSITY (Reflectance) | | | | | | | |
|---|---|---|---|---|---|---|---|---|
| | BLACK | | MAGENTA | | CYAN | | YELLOW | |
| PAPER SAMPLE | FRONT | BACK | FRONT | BACK | FRONT | BACK | FRONT | BACK |
| TWIN PLY (top: 50/50 Pulp/Silica) | | | | | | | | |
| 1. (8% of total thickness) | 1.19 | 0.23 | 0.86 | 0.11 | 1.08 | 0.24 | 0.69 | 0.21 |
| 2. (14% of total thickness) | 1.12 | 0.15 | 0.80 | 0.04 | 1.02 | 0.16 | 0.63 | 0.16 |
| 3. (20% of total thickness) | 0.98 | 0.16 | 0.78 | 0.04 | 0.98 | 0.16 | 0.59 | 0.15 |
| CONTROL COMMERCIAL PAPERS | | | | | | | | |
| A. Filled Ink Jet paper | 0.97 | 0.25 | 0.71 | 0.12 | 0.87 | 0.25 | 0.59 | 0.22 |
| B. Coated Ink Jet paper | 1.05 | 0.09 | 0.87 | 0.09 | 1.13 | 0.10 | 0.65 | 0.08 |

TABLE 2

| | | LINE WIDTH (μm) Double Pixel | | |
|---|---|---|---|---|
| Paper Sample | LINE WIDTH (μm) Single Pixel Black | Yellow | Magenta | Red (super-imposed Yellow & Magenta) |
| 1 | 280 ± 20 | 520 ± 20 | 500 ± 20 | 640 ± 50 |
| 2 | 225 ± 15 | 470 ± 20 | 480 ± 20 | 550 ± 30 |
| 3 | 220 ± 20 | 470 ± 60 | 470 ± 20 | 540 ± 40 |
| A | 275 ± 25 | 570 ± 50 | 580 ± 80 | 650 ± 30 |
| B | 180 ± 10 | 470 ± 20 | 470 ± 10 | 540 ± 40 |

TABLE 3

| PAPER SAMPLE | OPTICAL DENSITY (Reflectance) BLACK FRONT | BLACK BACK | MAGENTA FRONT | MAGENTA BACK | CYAN FRONT | CYAN BACK | YELLOW FRONT | YELLOW BACK |
|---|---|---|---|---|---|---|---|---|
| TWIN PLY (top: 50/50 Pulp/Silica) | | | | | | | | |
| 4. (8% of total thickness) | 1.21 | 0.19 | 0.88 | 0.07 | 1.11 | 0.18 | 0.68 | 0.17 |
| 5. (14% of total thickness) | 1.01 | 0.17 | 0.70 | 0.05 | 0.91 | 0.16 | 0.60 | 0.16 |
| 6. (20% of total thickness) | 0.89 | 0.17 | 0.67 | 0.04 | 0.82 | 0.17 | 0.52 | 0.15 |
| CONTROL COMMERCIAL PAPERS | | | | | | | | |
| A. Filled Ink Jet paper | 0.97 | 0.25 | 0.71 | 0.12 | 0.87 | 0.25 | 0.59 | 0.22 |
| B. Coated Ink Jet paper | 1.05 | 0.09 | 0.87 | 0.09 | 1.13 | 0.10 | 0.65 | 0.08 |

TABLE 4

| Paper Sample | LINE WIDTH (μm) Single Pixel Black | LINE WIDTH (μm) Double Pixel Yellow | Magenta | Red (super-imposed Yellow & Magenta) |
|---|---|---|---|---|
| 4 | 280 ± 30 | 525 ± 25 | 545 ± 35 | 630 ± 20 |
| 5 | 245 ± 15 | 460 ± 40 | 480 ± 20 | 590 ± 20 |
| 6 | 225 ± 15 | 470 ± 30 | 480 ± 20 | 530 ± 30 |
| A | 275 ± 25 | 570 ± 50 | 580 ± 80 | 650 ± 30 |
| B | 180 ± 10 | 470 ± 20 | 470 ± 10 | 540 ± 40 |

TABLE 5

| Paper Sample | $K_r$[1] mL/m$^2$ | $K_a$[1] mL/m$^2$ · sec ½ | $t_d$[1] (msec) |
|---|---|---|---|
| 5 | 36 | 60 | 12 |
| A | 20 | 82 | 5 |
| B | 19 | 21 | 17 |

Black glycol/water ink jet ink: surface tension 44 dynes/cm; and viscosity 2.3 cP.
[1]For definition of these constants, see Bristow, Svensk Papperstidn, 70, 623 (1967), the disclosure of which is totally incorporated herein by reference.

TABLE 6

| | Sample 7 | Sample B |
|---|---|---|
| OD (before) | 1.03 | 1.08 |
| OD (after 10 minutes water immersion and air drying) | 0.99 | 0.90 |
| ΔOD | 0.04 | 0.18 |
| Waterfastness (%) | 96.1 | 83.3 |

TABLE 7

| Paper Sample | Top/Base/Bottom PLY THICKNESS (%) | Single Pixel LINE WIDTH (μm) |
|---|---|---|
| TRI-PLY (Top and Bottom: 50/50 Pulp/Ca silicate) | | |
| 8 | 15/75/15 | 260 ± 40 |
| 9 | 20/65/20 | 260 ± 20 |
| 10 | 25/55/25 | 210 ± 10 |
| CONTROL | | |
| B | — | 200 ± 10 |

What is claimed is:

1. A twin ply uncoated paper for ink jet processes comprised of a supporting paper substrate sheet having essentially no filler additives as a first ply, and thereover as a second ply a paper sheet with filler additives attached to the fibers thereof, which filler additives are selected from the group consisting of synthetic silicas, inorganic silicates, sodium alumino-silicates, and inorganic oxides.

2. An uncoated paper in accordance with claim 1 wherein the thickness of the second ply is from about 5 to about 50 microns.

3. An uncoated paper in accordance with claim 1 wherein the thickness of the first ply is from about 50 to about 90 microns.

4. An uncoated paper in accordance with claim 1 wherein the thickness of the second ply is 15 microns.

5. An uncoated paper in accordance with claim 1 wherein the supporting substrate is obtained from bleached hardwoods and softwood fibers.

6. An uncoated paper in accordance with claim 1 wherein the supporting substrate is obtained from cotton fibers.

7. An uncoated paper in accordance with claim 1 wherein the supporting substrate is obtained from bleached mechanical pulp fibers.

8. An uncoated paper in accordance with claim 1 wherein the second ply paper is obtained from bleached hardwoods and softwood fibers.

9. An uncoated paper in accordance with claim 1 wherein the second ply paper is obtained from cotton fibers.

10. An uncoated paper in accordance with claim 1 wherein the second ply has incorporated therein a natural or synthetic product binder.

11. An uncoated paper in accordance with claim 1 wherein the second ply has incorporated therein cationically charged natural product and synthetic polymer materials.

12. An uncoated paper for ink jet paper comprising a supporting paper substrate sheet having essentially no filler additives as a first ply, which supporting substrate sheet is situated between a second ply and a third ply, wherein the second and third plies are paper sheets having filler additives attached to the fibers thereof, wherein the filler additives are selected from the group consisting of synthetic silicas, inorganic silicates, sodium alumino-silicates, and inorganic oxides.

* * * * *